Feb. 19, 1935.  A. L. BOEGEHOLD  1,991,539
METHOD OF MAKING PLASTIC BRONZE BEARINGS
Filed May 5, 1934
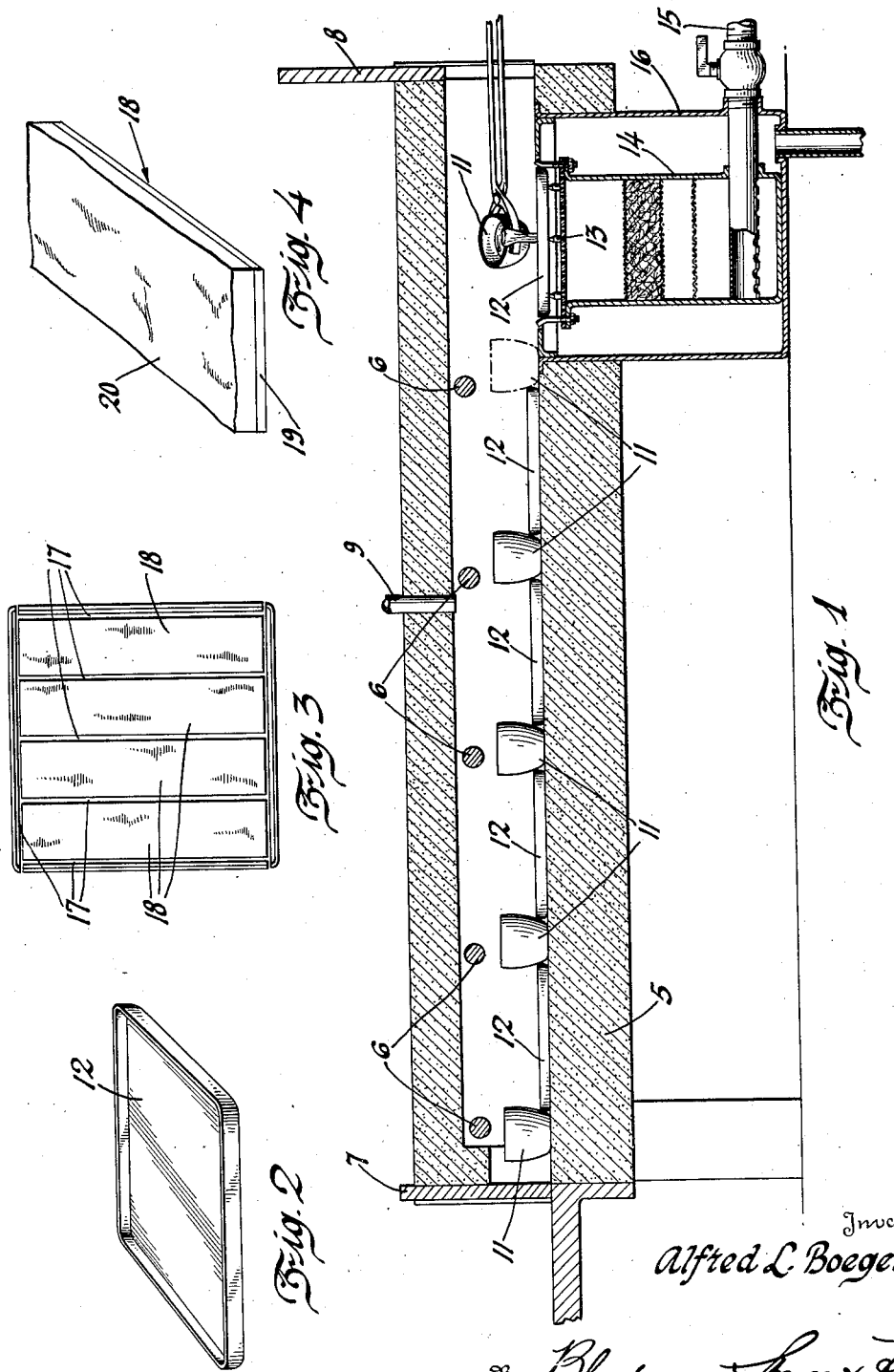
Inventor
Alfred L. Boegehold
By Blackmore, Spencer & Flint
Attorneys Patented Feb. 19, 1935

1,991,539

UNITED STATES PATENT OFFICE 1,991,539

METHOD OF MAKING PLASTIC BRONZE BEARINGS

Alfred L. Boegehold, Detroit, Mich., assignor to General Motors Corporation, Detroit, Mich., a corporation of Delaware Application May 5, 1934, Serial No. 724,002

5 Claims. (Cl. 22—204)

My invention relates to bearings comprising an iron or steel back or support to which a plastic bronze wearing face is united by being fused or autogenously welded thereto, so that the back and facing form a single unitary thing and in effect a single integral structure or device; and in performing my invention molten plastic bronze is poured into contact with a steel back which has been heated to a temperature corresponding, approximately, with that at which the plastic bronze melts; and the two are then rapidly cooled to a temperature below that at which the plastic bronze freezes.

Plastic bronze is a copper base metal containing a large percentage of lead. Typical mixtures are composed of from half copper and half lead, to 70 parts of copper and 30 parts of lead; although the lead content may be somewhat above 50 per cent or somewhat below 30 per cent without materially varying the characteristics of the plastic bronze mixture. Such plastic bronze mixtures often contain negligible amounts of nickel, tin, or other metals, say a few per cent; and quantities of calicum, metallic sulphides, sodium, or other substance to the extent of around one per cent or less are also sometimes present. The effect or claimed effect of these substances is ordinarily to secure uniform distribution of the lead throughout the bearing layer and to prevent segregation thereof from the copper as the molten plastic bronze cools and becomes solid; and like minute quantities of sulphur, tellurium and other substances are often added to improve the frictional qualities (reduce the friction) of the bearings produced. In my invention, however, such segregation is prevented by rapid cooling of the highly heated steel back and the molten bearing metal composition to a temperature below the freezing temperature of the plastic bronze, so that no substance having or claiming to have the effect of preventing segregation of the lead from the mixture need be used. However, pronounced improvements in plastic bronze bearings are secured by making them in accordance with my invention irrespective of the amounts of copper and of lead therein, and irrespective of whether or not other substances such as are above mentioned are present in small amounts in the molten bearing metal from which the facings of the bearings are formed.

My invention consists in a method of making plastic bronze bearings of the type above mentioned and while, being a method, it is independent of any particular apparatus and is applicable to the making of various particular forms of bearings, I have in describing the same shown some of the apparatus disclosed in the application for patent for Method of making bronze bearings, filed by Alfred L. Boegehold, Alfred W. Schluchter and Robin H. Terry, Serial Number 670,658, filed May 12th, 1933, and have disclosed my invention as used for the production of bearings of the form disclosed and claimed in said application.

The making of bearings by steps including the melting of a plastic bronze mixture and pouring it into contact with an iron or steel support or backing heated to approximately the temperature of molten plastic bronze is likely to result in the formation of a considerable amount of copper oxide because of the high temperature required for melting the copper, the strong affinity of copper and oxygen for one another, and the difficulty of excluding air from the molten mixture. Copper oxide is particularly objectionable in bearing facings as it is an unusually hard material and, when present, tends to score the crank pin or crank shaft journal with which bearings made in accordance with my improved method are for the most part used; and the presence of iron oxide upon the steel back is likewise objectionable in that it interferes with the formation of a proper fused bond between the same and the plastic bronze wearing facing. My invention, therefore, has for its object to exclude oxygen from the molten plastic bronze during the melting thereof not in contact with the steel back, and from the back during the heating thereof, and from both during the pouring step and the final rapid cooling of the two to a temperature below the temperature at which the plastic bronze becomes solid.

Referring now to the drawing herewith submitted and which illustrates apparatus by the use of which my improved method may be performed, as well as certain mechanical features and steps involved in the making of bearings in accordance with my invention, and of the particular form disclosed in the application above referred to:

Figure 1 is a view showing a longitudinal section upon a vertical plane of apparatus suitable for the making of bearings in accordance with the method wherein my invention consists.

Figure 2 is a perspective view showing an iron or steel pan or tray adapted to receive molten plastic bronze in the performing of my method.

Figure 3 is a view showing how the pan or tray is divided into rough strips from each of which a bearing may be made.

Figure 4 is a view showing one of such rough strips in perspective.

In the drawing there is shown a horizontal furnace 5 heated by resistance heating elements 6, and the inlet and outlet ends of which are closed by doors 7 and 8. The interior of this furnace is kept full of a nonoxidizing gas such, for example, as nitrogen which is neutral or carbon monoxide which will have a reducing action upon any small quantity of oxide which may be present within the furnace. This gas is supplied to the interior of the furnace through a conduit 9 in sufficient quantity to compensate for such leakage as occurs, because of the impracticability of making the furnace gas tight; and to insure that the furnace shall always be full a quantity of gas slightly in excess of that necessary to compensate for leakage is supplied, the excess escaping from the furnace at one or both ends thereof.

Crucibles 11 in which plastic bronze is melted and steel pans or trays 12 into which the molten plastic bronze is poured pass along and through the furnace 5 as indicated in Figure 1. Each crucible is of such capacity as to supply a single pan, and the number of crucibles and of pans within the furnace at a given time may be any number from one of each to a considerable number of each, as in the furnace illustrated. In the furnace illustrated pans 12 and crucibles 11 containing the solid ingredients necessary for forming plastic bronze to be melted are introduced in alternation at the left-hand end of the furnace, and are gradually heated as they pass therethrough. The trays and crucibles are moved along the floor of the furnace at a rate such that the plastic bronze within the crucible at the right-hand end of the line will be melted, and the corresponding pan will be heated to a temperature approximately that at which the plastic bronze melts, by the time the pan and crucible at the end of the line reach the right-hand end of the furnace. At the end of its forward movement the pan at the right-hand end of the line is moved onto a support 13 arranged over the open upper end of a tank 14, to which water is supplied through a valved controlled supply pipe 15. The crucible immediately following this pan is left standing at the end of the line as indicated in dotted lines, Figure 1; and said crucible is next grasped by tongs or an equivalent instrument introduced into the right-hand end of the furnace, the molten plastic bronze therein is poured into the pan which is resting upon the support 13, and the empty crucible removed from the furnace.

The next step in the making of bearings in accordance with my method consists in suddenly cooling the tray resting upon the support 13 and the molten plastic bronze therein to a temperature below the freezing point of the plastic bronze. This is accomplished by admitting water through the pipe 15 into the tank 14 wherein it rises through suitable baffles to secure uniform upward movement of the surface thereof, and finally contacts with the bottom of the pan and overflows into the waste casing 16. The sudden cooling of the pan and the molten plastic bronze therein prevents the lead and copper from segregating and secures a uniform distribution of the lead content throughout the plastic bronze layer; and contributes also to the formation of a fused bond between the bottom of the pan and the layer of plastic bronze therein, all as more fully and at length explained in the application for patent hereinbefore referred to. After the cooling step the pan which now has a solid layer of plastic bronze fused to its bottom is removed from the furnace as by suitable tongs, and another pan and another crucible containing unmelted plastic bronze is introduced into the left-hand inlet end of the furnace.

The steel pan with the layer of plastic bronze welded to its bottom is next slitted as at 17, Figure 3, to provide rough strips 18, Figure 4, comprising a steel back 19 and a plastic bronze facing 20 fused thereto; and this strip is finished to form a bearing by subjecting it to appropriate milling, grinding and bending operations, all as explained in the application for patent hereinbefore referred to.

It therefore follows that the melting of the plastic bronze and the heating of the steel trays to a temperature approximately that required for melting the plastic bronze, the pouring of the molten plastic bronze into the steel pans, and the sudden cooling of the pans and molten plastic bronze to a temperature below the freezing temperature of the latter, all occur in a non-oxidizing atmosphere, whereby oxidation of the plastic bronze and of the steel pans is prevented. Oxidation of the lead is also and in the same way prevented, but lead oxide even if present would do little or no harm because it is lacking in the abrasive qualities and hardness present in copper oxide. The opening of the doors to pour the molten plastic bronze into a pan, to remove the pan after sudden cooling, and to introduce a new pan and crucible at the intake end of the furnace of course establish momentary communications with the external atmosphere; but these are of short duration and there is a continuous though slow flow of the gas into the furnace and out therefrom through leakage, and through the doors, so that the interior of the furnace is kept substantially free from oxygen at all times.

The gas supplied to the interior of the furnace and which always fills the same thus excluding air therefrom acts, as will be appreciated, to prevent the formation of copper oxide upon the molten plastic bronze within the crucibles, and of iron oxide upon the steel pans; and acts also when as preferred said gas is a reducing gas to convert such small quantities of oxides as may sometimes be present upon the pans or upon the molten plastic bronze into their respective metals. Various kinds of gases may be used but those which will be absorbed by molten plastic bronze are unsuitable, because their rejection or exclusion therefrom as the plastic bronze solidifies will result in porosity of the bearing facing, which is objectionable. Hydrogen, for example, would be satisfactory so far as concerns its reducing action; but large quantities of it would be absorbed by molten plastic bronze, and rejected during freezing thereof, thus resulting in an objectionable porous condition in the wearing facing of the bearing.

In order, therefore, to produce a dense bearing layer free from porosity the non-oxidizing or reducing gas must be one which will not be absorbed in the molten plastic bronze to any substantial extent. I have found as the result of extensive experimentation that carbon monoxide is a suitable gas to use in the making of bearings in accordance with any improved method, as it prevents the formation of oxides and is not dissolved by the molten plastic bronze to any appreciable degree. A mixture of carbon monoxide, carbon dioxide, and a small quantity of hydrogen has also been found to give satisfactory results, although the amount of hydrogen therein must be kept below a certain upper limit, which is around 15%, as it is absorbed by the molten plastic bronze if present in a considerable amount and is apt to cause porosity in the bearing facing if more than a small quantity thereof is present. Carbon dioxide when present must be to an extent insufficient to make the atmosphere inside the furnace oxidizing.

A reducing gas within the furnace and under slight pressure as hereinbefore explained acts to exclude oxygen of the surrounding atmosphere from the pans and crucibles and at the same time to reduce such small quantities of oxides as may be present, as well as to counteract incipient formation of oxides and inhibit oxidation to any appreciable extent. My invention, however, in its broader aspect contemplates the heating of the pans, the melting of the plastic bronze, the pouring thereof, and the sudden cooling of the pans and plastic bronze in them all under conditions such that oxidation cannot occur; and while as explained that end may best be attained by keeping the furnace full of a reducing gas, the same result so far as preventing of the formation of oxides of copper and iron is concerned may be attained by keeping the furnace full of an inert gas having little or no reducing action. Thus nitrogen may be used in place of the reducing gases mentioned to provide an oxygen free atmosphere within the furnace which gas, while it has no reducing action, acts nevertheless to prevent oxidation of the copper of the plastic bronze and of the steel pans. When nitrogen is thus used the pans will be coated with a suitable flux before being introduced into the furnace as steel ordinarily has an appreciable coating of iron oxide on it which has to be removed in order to secure proper fusion and intermingling of molecules along the joint between the plate and the plastic bronze layer united thereto which result the flux will secure; whereas the plastic bronze itself oxidizes less readily under ordinary atmospheric conditions and such small amount of copper oxide as may be on it prior to melting affects the character of the bearing metal layer, and not the bond between the parts.

Thus when nitrogen is used a flux is required to remove iron oxide from the pans, and further oxidation of both the pans and the plastic bronze is prevented by the exclusion of oxygen from them by the nitrogen, during their passage through the furnace. I prefer, however, to avoid the use of a flux which result is attained by the use of a reducing gas within the furnace in accordance with the preferred form of my invention. When a reducing gas is used no flux is necessary, for the gas not only excludes oxygen from the pans and the plastic bronze during heating but acts further to reduce such residual oxides as may have been on or in them initially, as well also as such as may be due to accidental and uncontrollable entrance of atmospheric air into the furnace which may occur when the doors are momentarily opened as hereinbefore explained.

While I have illustrated my invention as applied to the making of bearings by steps which include the pouring of molten plastic bronze into a highly heated receptacle in the form of a shallow pan or tray, the bottom of which is subsequently machined and bent to form a bearing, my invention is likewise applicable to the making of bearings by steps which involve the pouring of molten plastic bronze into a highly heated receptacle of annular form which is subsequently machined to form a bearing, but which involves no bending, as in the application for patent for Bronze lined bearings filed by Norman H. Gilman upon May 6, 1929, Serial Number 360,899.

Having thus described and explained my invention I claim and desire to secure by Letters Patent:

1. In a method for making plastic bronze bearings the steps which consist in heating a crucible containing plastic bronze and a ferrous metal receptacle simultaneously, and within a chamber filled with a non-oxidizing gas, to a temperature sufficient to melt the plastic bronze; pouring the molten plastic bronze into the receptacle while both remain within said chamber; and rapidly cooling said receptacle and the molten plastic bronze therein to a temperature below the freezing temperature of the plastic bronze while both remain within the chamber aforesaid.

2. In a method for making plastic bronze bearings the steps which consist in passing crucibles containing plastic bronze, and ferrous metal receptacles, along a furnace filled with a non-oxidizing gas, whereby said crucibles and receptacles are heated to a temperature sufficient to melt the plastic bronze; pouring molten plastic bronze from a crucible into a receptacle while both remain within the furnace; and rapidly cooling said receptacle and the molten plastic bronze therein to a temperature below that at which the plastic bronze becomes solid while both remain exposed to the non-oxidizing gas within said furnace.

3. The method steps enumerated in claim 1 varied in that the gas within the furnace is a non-oxidizing mixture of carbon monoxide, carbon dioxide, and hydrogen and nitrogen.

4. The method steps enumerated in claim 1 varied in that the gas within the furnace is carbon monoxide.

5. The method steps enumerated in claim 1 varied in that the gas within the furnace is nitrogen.

ALFRED L. BOEGEHOLD.